United States Patent [19]

Robertson

[11] Patent Number: 4,574,689
[45] Date of Patent: Mar. 11, 1986

[54] COMPACT BARBECUE OVEN

[75] Inventor: Michael L. Robertson, Marion, Ill.

[73] Assignee: B. B. Robertson Company, Marion, Ill.

[21] Appl. No.: 722,838

[22] Filed: Apr. 12, 1985

Related U.S. Application Data

[63] Continuation-in-part of Ser. No. 488,180, Apr. 25, 1983, Pat. No. 4,510,854.

[51] Int. Cl.$^4$ ............................................. A47J 37/04
[52] U.S. Cl. ........................................ 99/337; 99/352; 99/427; 99/443 C; 99/476; 99/479; 126/21 A; 126/41 B
[58] Field of Search ................. 99/331, 337, 345, 347, 99/352, 421 HV, 443 C, 447, 448, 474–477, 479, 481; 126/21 A, 41 B, 338; 426/523

[56] References Cited

U.S. PATENT DOCUMENTS

| | | | |
|---|---|---|---|
| 928,695 | 7/1909 | Pinegar | 99/474 X |
| 2,715,870 | 8/1955 | Rutkowski | 99/421 HV |
| 2,833,201 | 5/1958 | Simank | 126/21 A |
| 3,041,959 | 7/1962 | Oyler | 126/287 X |
| 3,397,632 | 8/1968 | Moler | 99/446 X |
| 3,568,590 | 3/1971 | Grice | 99/446 |
| 3,665,840 | 5/1972 | Horany | 99/479 |
| 3,792,654 | 2/1974 | Turner | 99/427 |
| 3,951,052 | 4/1976 | Ringo | 99/427 |
| 3,961,571 | 6/1976 | Decuir | 99/480 X |
| 4,300,523 | 11/1981 | Robertson | 99/427 X |

Primary Examiner—Billy J. Wilhite
Attorney, Agent, or Firm—Gravely, Lieder & Woodruff

[57] ABSTRACT

A highly compact oven for preparing barbecued foods on a commercial basis includes a cabinet having a vertical partition wall that divides its interior into an oven chamber and an equipment compartment, and doors which provide access to the oven chamber. In addition, the oven has a rotisserie for supporting foods in the upper portion of the oven chamber opposite one of the doors, and this rotisserie is turned by a motor in the equipment compartment. A cylindrical firebox in which wood is burned is located in the lower portion of the oven chamber opposite another of the doors to provide the heat required for cooking the food and the smoke for imparting the barbecue flavor to that food. Food on the rotisserie is shielded from the firebox by a baffle wall which extends across the oven chamber, yet has its margins spaced from the front and back walls, so that heated air and smoke circulate freely between the region of the firebox and the region of the rotisserie. Moreover, the firebox is exposed to the oven chamber along its cylindrical side wall and end walls, so that maximum transfer of heat to the circulating air occurs. Wood that is placed within the firebox is ignited by a burner that is located in the equipment compartment and projects its flame through a sleeve that extends between the firebox and the vertical partition wall.

12 Claims, 4 Drawing Figures

COMPACT BARBECUE OVEN

RELATED APPLICATION

This application is a continuation-in-part of application Ser. No. 488,180 of Michael L. Robertson, filed Apr. 25, 1983 now U.S. Pat. No. 4,510,854, and entitled COMPACT BARBECUE OVEN. Application Ser. No. 488,180 is incorporated into this application by reference.

BACKGROUND OF THE INVENTION

This invention relates in general to ovens for cooking food, and more particularly to a compact barbecue oven.

Barbecued foods have traditionally been prepared over open fires, and while this procedure may be acceptable for an occasional back yard barbecue, it is not suitable for the preparation of barbecued foods on a large scale commercial basis. Indeed, open fires are most inefficient, and require an exceptionally large surface area to cook foods in even reasonable quantities. Many restaurants that specialize in barbecue foods utilize commercial barbecue ovens for preparing their foods. These ovens often contain a rotisserie for supporting a large quantity of food in a relatively confined space, and have some type of firebox or burner arrangement. Indeed, the true barbecue flavor can only be obtained when a wood-burning firebox is employed, and in some of these ovens the firebox is located in the actual oven chamber, while in others the firebox is located remote from the oven chamber. In either case, the oven occupies a considerable amount of floor space and may not be suitable for restaurants that do relatively modest business in barbecue foods. Furthermore, many barbecue ovens of current manufacture derive most of their heat from expensive fuels such as natural or liquid petroleum gas or from other energy sources such as electricity.

SUMMARY OF THE INVENTION

One of the principal objects of the present invention is to provide a barbecue oven that is highly compact and occupies relatively little floor space. Another object is to provide a barbecue oven that contains within its oven chamber a firebox in which wood may be burned to provide the food as it is cooked with the true barbecue flavor. A further object is to provide a barbecue oven which enables smoke to accumulate in the region where the food is supported within the oven. An additional object is to provide a barbecue oven of the type stated that is simple in construction and inexpensive to manufacture. These and other objects and advantages will become apparent hereinafter.

DESCRIPTION OF THE DRAWINGS

In the accompanying drawings which form part of the specification and wherein like numerals and letters refer to like parts wherever they occur -

DETAILED DESCRIPTION

Figure 1:
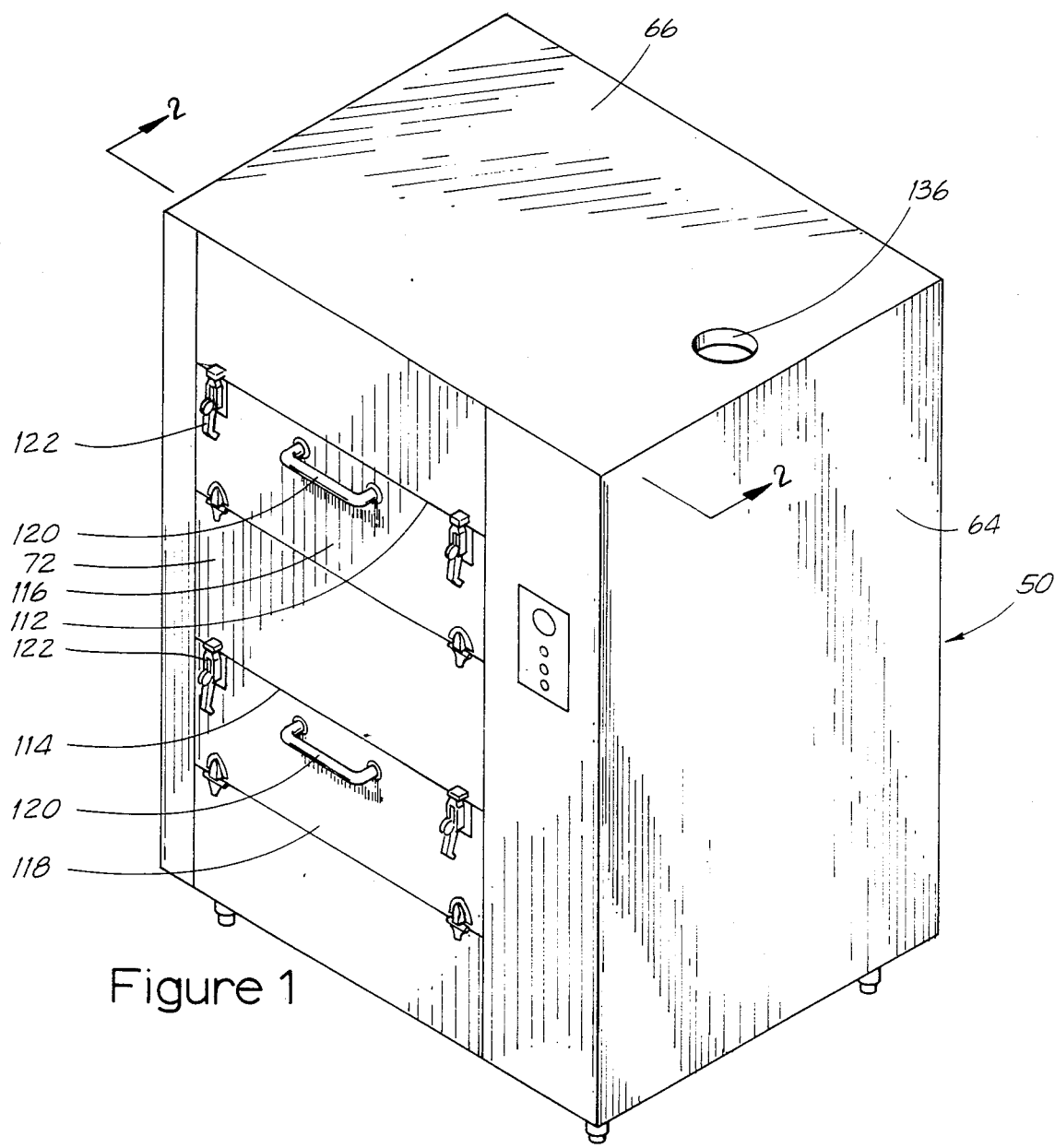
FIG. 1 is a perspective view of a compact barbecue oven constructed in accordance with and embodying the present invention.
Figure 4:
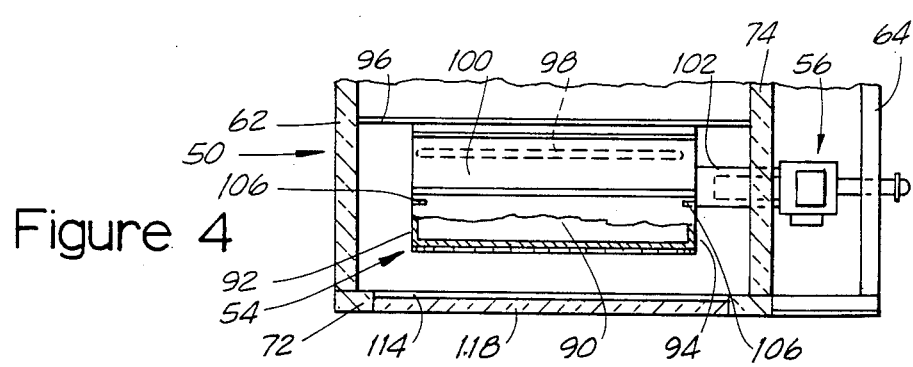
FIG. 4 is a sectional view taken along line 4—4 of FIG. 3 and showing primarily the firebox.
Figures 2, 3:
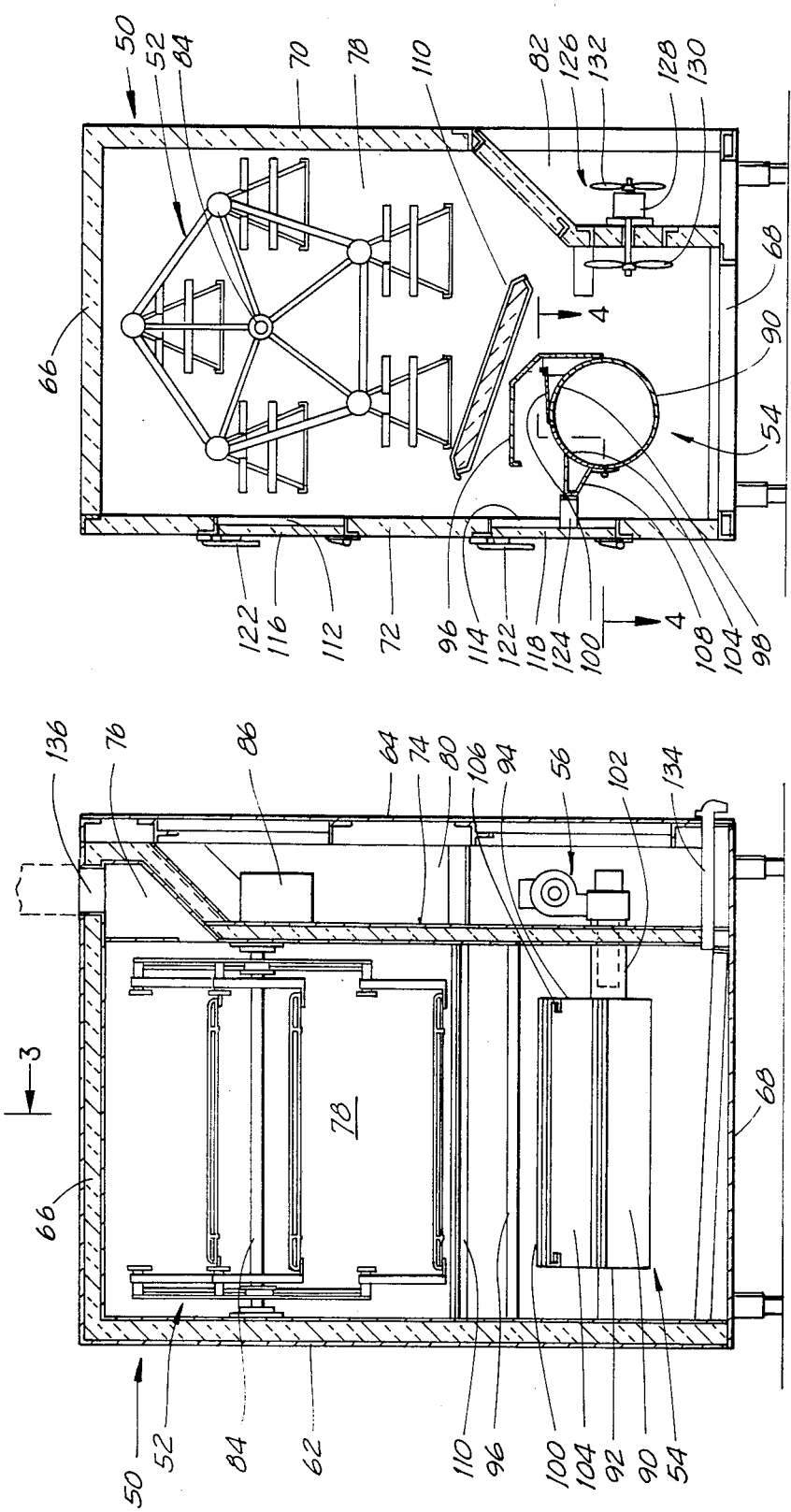
FIG. 2 is a sectional view taken along line 2—2 of FIG. 1.
FIG. 3 is a sectional view of the oven taken along line 3—3 of FIG. 2.

Referring now to the drawings, a highly compact barbecue oven B includes a cabinet 50 that houses or otherwise supports all of the major components of the oven B. Among those components are a rotisserie 52 located in the upper portion of the cabinet 50, a firebox 54 located in the lower portion of the cabinet 50, and a burner 56 positioned to direct a flame into the firebox 54.

The cabinet 50 possesses a box-like configuration in that it has four corners formed by left and right side walls 62, 64, a top wall 66, a bottom wall 68, a back wall 70, a front wall 72, all of which are joined rigidly together into the box-like configuration. In addition, the cabinet 50 has a vertical partition wall 74 which is located between and parallel to the side walls 62, 64, it being closer to the latter than the former. The partition wall 74 extends upwardly from the bottom wall 68, and near the top wall 66 a small portion of the partition wall 74 flares outwardly toward the side wall 64 to form a flue chamber 76. The partition wall 74 divides the interior of the cabinet 50 into an oven chamber 78 and equipment compartment 80, the former being between the partition wall 74 and the left side wall 62, while the latter is between the partition wall 74 and the right side wall 64. The back wall 70 behind the equipment compartment 80 is perfectly flat and extends from the top wall 66 to the bottom wall 68. However, behind the lower portion of the oven chamber 78 the rear wall 70 is offset forwardly somewhat, it having an oblique section and a short vertical section which provides a recess 82 at the rear of the cabinet 50. The left side wall 62, the top wall 66, the front wall 72 and the partition wall 74 are all heavily insulated, as is that portion of the back wall 70 which closes the oven chamber 78. By reason of the offset at the lower end of the back wall 70, the upper portion of the oven chamber 78 is somewhat deeper that the lower portion.

The upper portion of the oven chamber 78 contains the rotisserie 52 which revolves on an axle 84 that extends between and is supported on the left side wall 62 and the partition wall 74. Indeed, the axle 84 extends through the partition wall 74 and into the equipment compartment 80 where it is connected to a motor 86 which turns the rotisserie 52.

The firebox 54, on the other hand, is in the lower portion of the oven chamber 78 generally in front of the short vertical section at the lower end of the back wall 70. The firebox 54 possesses a cylindrical configuration, and accordingly has a longitudinal or side wall 90 that is cylindrical and two end walls 92 and 94. All three of the walls 90, 92 and 94 are spaced from the walls 62, 66, 68, 70, 72, and 74 which enclose the oven chamber 78. More specifically, the end wall 92 faces the left side wall 62, but is spaced from it, whereas the other end wall 94 faces the partition wall 74, yet is spaced from it. The cylindrical side wall 90 has its axis horizontal and parallel to the back wall 70 and front wall 72, and generally the bottom wall 68 as well, but is spaced from each of those walls. Thus, all three of the firebox walls 90, 92 and 94 are exposed to the oven chamber 78.

The firebox 54 is suspended in the oven chamber 78 from a heat shield 96 which is formed from sheet metal and extends across the lower part of the oven chamber 78 from the left side wall 62 to the partition wall 74, it being attached at its ends to both. The shield 96 includes an upper portion which is presented horizontally within the oven chamber 78 generally above the firebox 54, a rear portion which is presented vertically in the chamber 78 behind the upper rear quadrant of the firebox 54, and an oblique intermediate portion which extends between the upper and rear portions. The cylindrical side wall 90 of the firebox 54 is attached to the vertical rear portion of the heat shield 96, but the horizontal upper portion is spaced upwardly away from the cylindrical side wall 90.

The cylindrical side wall 90 of the firebox 54, in the region thereof that is presented toward the oblique portion of the heat shield 96, is provided with a longitudinally directed slot 98 that extends substantially the full length of the side wall 90. The slot 98 permits smoke to escape from the interior of the firebox 54 and enter the oven chamber 78 to flavor food on the rotisserie 52. While the slot 98 opens into the oven chamber 78, it is nevertheless obscured from above by the heat shield 96 and also by a deflector plate 100. The latter is attached to the top of the cylindrical wall 90 and projects rearwardly, generally horizontally, toward vertical portion of the heat shield 96, yet is spaced from the heat shield 96. Smoke escaping from the slot 98 is thus directed rearwardly by the deflector plate 100 and thence forwardly by the heat shield 96, so that it passes upwardly along the cabinet front wall 72 into the region of the rotisserie 52.

The firebox 54 also has a sleeve 102 which extends from its right end wall 94 to and indeed through the partition wall 74. The interior of the sleeve 102 opens into the portion of the firebox 54 enclosed by the cylindrical side wall 90, as well as into the equipment compartment 80, where it accommodates the burner 56 which may be a conventional type gas conversion burner having a tube from which the fire is emitted. That tube projects into the sleeve 102. When ignited, the burner 56 directs a flame into the sleeve 102 and the larger interior portion of the firebox 54 enclosed by the cylindrical side wall 90. The air for maintaining combustion within the firebox 54 enters the firebox 54 through the burner 56 and the sleeve 102. The burner 56 is under the control of a thermostat which senses the temperature in the upper portion of the oven chamber 78.

Finally the firebox 54 has a door 104 which is actually an arcuate segment of the cylindrical side wall 90. The door 104 in effect occupies the front upper quadrant of the firebox 54 and extends substantially the full distance between the two end walls 92 and 94. It is hinged along its lower margin to the remainder or fixed portion of the side wall 90, so that when opened, it swings forwardly toward the cabinet front wall 72 and then downwardly. Near its upper margin at each end, the door 104 has an angle bracket attached with a cutout 106 where a removable handle may be engaged with the door 104 to swing the door 104 to its open position. The handle is, of course, short enough to clear the heat shield 96 as the door 104 swings to its open position. The door 104 also has a bracket 108 which projects forwardly from it when the door 104 is in its closed position. Of course, when the door 104 is open, logs may be loaded into the firebox 54, and these logs will be ignited when burner 56 is energized.

The cabinet 50 also includes a baffle wall 110 which extends through the oven chamber 78 in the space between the rotisserie 52 and the firebox 54 and at its ends is attached to the left side wall 62 and the partition wall 74. While the baffle wall 110 extends laterally to the side wall 62 and partition wall 74, its front margin is spaced from the front wall 72 and its rear margin is spaced from the back wall 70. Actually, the rear margin is located opposite the oblique section of the back wall 70, that is the section at the recess 82, and the baffle wall 110 is inclinded downwardly to that section of the back wall 70. In other words, the baffle wall 110 is itself oblique, but it is not pitched at an angle as great as the oblique section of the back wall 70. The baffle wall 110 is insulated much like the walls 62, 66, 68, 70, 72, and 74 which enclose the oven chamber 78.

The front wall 72 of the cabinet 50 includes an upper opening 112 which is located opposite to the rotisserie 52 generally at the elevation of the axle 84 thereof and a lower opening 114 at the elevation of the door 104 to the firebox 54, the former being normally occupied by a door 116, while the latter is normally occupied by a door 118. The two doors 116 and 118 are hinged to the cabinet front wall 72 along the lower margins of their respective openings 112 and 114, and thus swing downwardly and outwardly when opened. However, when closed the doors 116 and 118 in effect form a continuation of the front wall 72, and like the remainder of the front wall 72, they are insulated. Each door 116 and 118 has an insulated handle 120 for grasping it and also a pair of manually operated latches 122 for holding it in its closed position. In addition, the lower door 118, on its inside face is fitted with a bar 124 which, when the door 118 is closed, bears against the bracket 108 on the firebox door 102 to insure that the firebox door 104 is closed. Indeed, unless the firebox door 104 is closed, the bracket 108 on that door will interfere with the bar 124 on the lower cabinet door 118 as the lower door 118 is moved to its closed position, and thus will prevent the lower door 118 from reaching its fully closed position. In other words, by reason of the bracket 108 on the firebox door 104 and the bar 124 on the lower cabinet door 118, the lower cabinet door 118 cannot be closed until the firebox door 104 is fully closed. Of course, when the two doors 118 and 104 are open, logs may be loaded into the firebox 54.

The cabinet back wall 70 at its vertical lower section carries a circulating fan 126 including an electric motor 128 and an inside fan blade 130 and an outside fan blade 132. Both the outside fan blade 132 and the motor 128 are located in the recess 82, and when the motor 128 is in operation, the blade 132 directs a stream of cool air across the motor 120, keeping it at a reasonably low operating temperature. The inside fan blade 130, on the other hand, is located within the oven chamber 78 directly behind the firebox 54, and when the motor 128 is in operation, the blade 130 directs heated air from within the oven chamber 78 across the bottom of the firebox 54 generally through the space between the firebox 54 and the cabinet bottom wall 68, as well as across the top of the heat shield 96 generally through the space between the heat shield 96 and the baffle wall 110.

At the lower end of the partition wall 74 is a drain pipe 134 which extends through the equipment compartment 80 for draining grease which collects on the cabinet bottom wall 68. Indeed, the cabinet bottom wall 68 slopes slightly downwardly to the drain pipe 134.

The cabinet top wall 66 in the region above the equipment compartment 80 is provided with a flue opening 136 which opens into the flue chamber 76. A conventional flue pipe fits to the flue opening 136.

To place the oven in operation, the upper cabinet door 116 is opened and food is inserted through its opening 112 and placed onto the rotisserie 52. When the desired amount of food is loaded, the door 116 is again closed. The lower cabinet door 118 is also opened to expose the firebox 54 and its door 104 is likewise opened. Logs are inserted through the lower opening 114 into the firebox 54, whereupon the firebox door 104 is closed as is the cabinet door 118 behind it. Indeed, the cabinet door 118 will not shut until the firebox door 104 is in its fully closed position.

Once the firebox 54 has received a supply of logs, the burner 56 is ignited. It directs a flame through the sleeve 102 and into the larger interior portion of the firebox 54 where the flame impinges on the logs and ignites them. When the combustion is capable of sustaining itself, the burner 56 shuts off. The air for supporting the combustion enters through the burner 56 and the sleeve 102.

The combustion within the firebox 54 heats the cylindrical side wall 90 as well as the end walls 92 and 94 on the firebox 54, and the heated side wall 90 in turn radiates and conducts heat to the heat shield 96. The inside face blade 130 of the circulating fan 126 causes air within the oven chamber 78 to flow across the back of the cylindrical side wall 90 for the firebox 54, the air going both upwardly and downwardly. The downwardly directed stream flows beneath the cylindrical side wall 90 and then upwardly across the front of the cylindrical wall 90, whereupon it rises through the space between the cabinet front wall 72 and the baffle wall 110. The upwardly directed stream flows over the heat shield 96, whereupon it likewise rises through the space between the cabinet front wall 72 and the baffle wall 110. Some of the circulating air also passes across the end walls 92 and 94 of the firebox 54. Of course, the air as it flows across the walls 90, 92 and 94 of the firebox 54 and likewise across the rear and top of the heat shield 96 is heated and undergoes a significant rise in temperature. It also acquires smoke which pases outwardly from the slot 98 of the firebox 54.

The heated and smoke-laden air issues from the space between the cabinet front wall 72 and the baffle wall 110 and heats the upper portion of the oven chamber 78 where the rotisserie 52 is located, the temperature of the air being hot enough to cook food that is on the rotisserie 52 which revolves. The smoke, on the other hand, imparts a barbecue flavor to the food. Some of the heated air is exhausted through the flue chamber 76 and flue opening 136, to be discharged into a flue which is connected with that opening. However, most of the air passes downwardly through the space between the cabinet back wall 70 and the baffle wall 110 and returns to the inside fan blade 130 which recirculates it past the firebox 54 and its heat shield 96 as previously described.

This invention is intended to cover all changes and modifications of the example of the invention herein chosen for purposes of the disclosure which do not constitute departures from the spirit and scope of the invention.

I claim:

1. A barbecue oven comprising: a cabinet including walls which enclose an oven chamber having upper and lower portions, some of the enclosing walls being upright; door means in at least one of the upright walls for providing access to the oven chamber; support means for supporting food in the upper portion of the oven chamber, the support means being accessible through the door means, so that food may be loaded onto or removed from the support means; a firebox located in the lower portion of the oven chamber generally directly below the support means and also being accessible through the door means, the firebox having at least one longitudinal wall and two end walls and a door that together enclose a space in which a fire is contained, the firebox door being in the longitudinal wall and being accessible through the door means so that a solid fuel may be loaded into the firebox, the firebox containing an aperture which opens into the oven chamber to enable smoke to pass from the firebox to the oven chamber, the firebox having its longitudinal wall and both of its end walls and its door spaced from all of the cabinet walls and from the door means such that air and smoke within the oven chamber may circulate past sides, ends, and bottom of the firebox, the firebox further having a sleeve which extends to one of the cabinet walls, the combustion which occurs in the firebox being the sole source of heat for the oven chamber; a burner mounted on the cabinet and being aligned with and directed into the sleeve on the firebox, the burner being capable of producing a flame which passes into the interior of the firebox to impinge on solid fuel in the firebox; and a baffle wall located in the oven chamber between the support means and the firebox, the baffle wall extending only partially across the oven chamber and being spaced from opposite upright walls of the oven chamber, so that air and smoke may circulate between the upper and lower portions of the oven chamber; and a fan located in the oven chamber for moving air and smoke between the upper and lower portions of the oven chamber and past the baffle wall as it does and for further causing air and smoke to circulate past the firebox.

2. A barbecue oven according to claim 1 wherein the longitudinal wall of the firebox is cylindrical.

3. A barbecue oven according to claim 1 wherein the door means includes an upper door located in one of the upright walls opposite the support means and a lower door located in one of the upright walls opposite the firebox.

4. A barbecue oven according to claim 3 wherein the upper and lower doors are in the same upright wall of the cabinet.

5. A barbecue oven according to claim 4 wherein the doors are in an upright front wall of the cabinet and the cabinet also includes a generally upright back wall located opposite to and facing the front wall, and wherein the baffle wall is spaced from the front and back walls so that smoke-laden heated air may circulate past both the front and rear margins of the baffle wall.

6. A barbecue oven according to claim 5 wherein the longitudinal wall of the firebox is cylindrical and the firebox is mounted such that the axis of the longitudinal wall is generally horizontal and parallel to the front and back walls.

7. A barbecue oven according to claim 6 wherein the door to the firebox is in and forms part of the longitudinal cylindrical wall.

8. A barbecue oven according to claim 7 wherein the door for the firebox is hinged to the longitudinal wall of the firebox at its lower margin and when opened swings outwardly and downwardly; and further comprising means on the lower cabinet door and the firebox door to insure that the firebox door is fully closed when the oven door is fully closed.

9. A barbecue oven according to claim 1 and further comprising a sheet metal heat shield interposed between the firebox and the baffle wall.

10. A barbecue oven according to claim 1 wherein the sleeve extends from one of the end walls of the firebox.

11. A barbecue oven comprising: a cabinet having spaced apart side walls, top and bottom walls, a back wall, a front wall, a partition wall which is disposed intermediate the side walls and divides the cabinet into an oven chamber having upper and lower portions and an equipment compartment, and upper and lower doors which are hinged to front wall; support means mounted on the cabinet in the upper portion of the oven chamber for supporting food in the oven chamber opposite the upper door; a firebox mounted in the lower portion of the oven chamber opposite the lower door and having at least one longitudinal wall and two end walls and a door that together totally enclose a space in which a fire is contained, the firebox walls being spaced from the walls and door of the cabinet so that air within the oven chamber will circulate along those walls of the firebox, the firebox door being in the longitudinal wall and being accessible when the lower door is open and when open exposing the interior of the firebox, so that wood may be loaded into the firebox, the firebox also having an aperture which opens into the oven chamber so that smoke may escape from the firebox into the oven chamber, the firebox further having a sleeve extended between one of the firebox walls and the vertical partition wall, the combustion which occurs in the firebox being the sole source of heat for the oven chamber; a burner located in the equipment compartment and being adapted to produce a flame that discharges into the firebox from the sleeve; a baffle wall located between the support means and the firebox and being extended between and attached to the partition wall and the cabinet side wall that form the sides of the oven chamber, the baffle wall being spaced from the cabinet back wall and from the cabinet front wall, so that air and smoke will circulate between the upper and lower portions of the oven chamber; and a fan mounted on the cabinet and located in the oven chamber for enhancing the circulation of air and smoke across the firebox and between the upper and lower portions of the oven chamber.

12. A barbecue oven according to claim 11 wherein the longitudinal wall of the firebox is cylindrical.

* * * * *